US007395664B2

(12) United States Patent
Brockmann et al.

(10) Patent No.: US 7,395,664 B2
(45) Date of Patent: Jul. 8, 2008

(54) HYDRAULIC SYSTEM FOR UTILITY VEHICLES, IN PARTICULAR AGRICULTURAL TRACTORS

(75) Inventors: Andreas Brockmann, Bidingen (DE); Michael Martens, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 220 days.

(21) Appl. No.: 11/472,503

(22) Filed: Jun. 21, 2006

(65) Prior Publication Data

US 2007/0101710 A1 May 10, 2007

(30) Foreign Application Priority Data

Nov. 8, 2005 (GB) ................................ 0522719.4

(51) Int. Cl.
*F16D 31/02* (2006.01)

(52) U.S. Cl. .......................................... 60/452; 60/422

(58) Field of Classification Search .................. 60/422, 60/445, 452
See application file for complete search history.

(56) References Cited

U.S. PATENT DOCUMENTS 6,105,367 A * 8/2000 Tsuruga et al. ................ 60/422
6,314,729 B1 * 11/2001 Crull et al. .................... 60/452
6,644,025 B1 * 11/2003 Oberhausser et al. ......... 60/422
6,874,318 B1 * 4/2005 MacLeod ..................... 60/452

* cited by examiner

*Primary Examiner*—Michael Leslie
(74) *Attorney, Agent, or Firm*—Ryan A. Schneider, Esq.; Troutman Sanders LLP

(57) ABSTRACT

Disclosed is a hydraulic system for utility vehicles, in particular agricultural tractors, for supplying primary and/or auxiliary pressure medium consumers (6, 11, 12) with pressure medium, comprising a pump (1), whose pressure and flow are controlled as a function of the load pressure of the pressure medium consumers by a pressure and flow controller (13) to which whenever auxiliary pressure medium consumers (11, 12) are operating, a higher load pressure compared to the actual load pressure is reported through an amplifier device. In order to obtain rapid response of an actuated auxiliary pressure medium consumer it is proposed that the amplifier device (29) consists of a proportionally controllable pressure reducing valve (39).

2 Claims, 1 Drawing Sheet

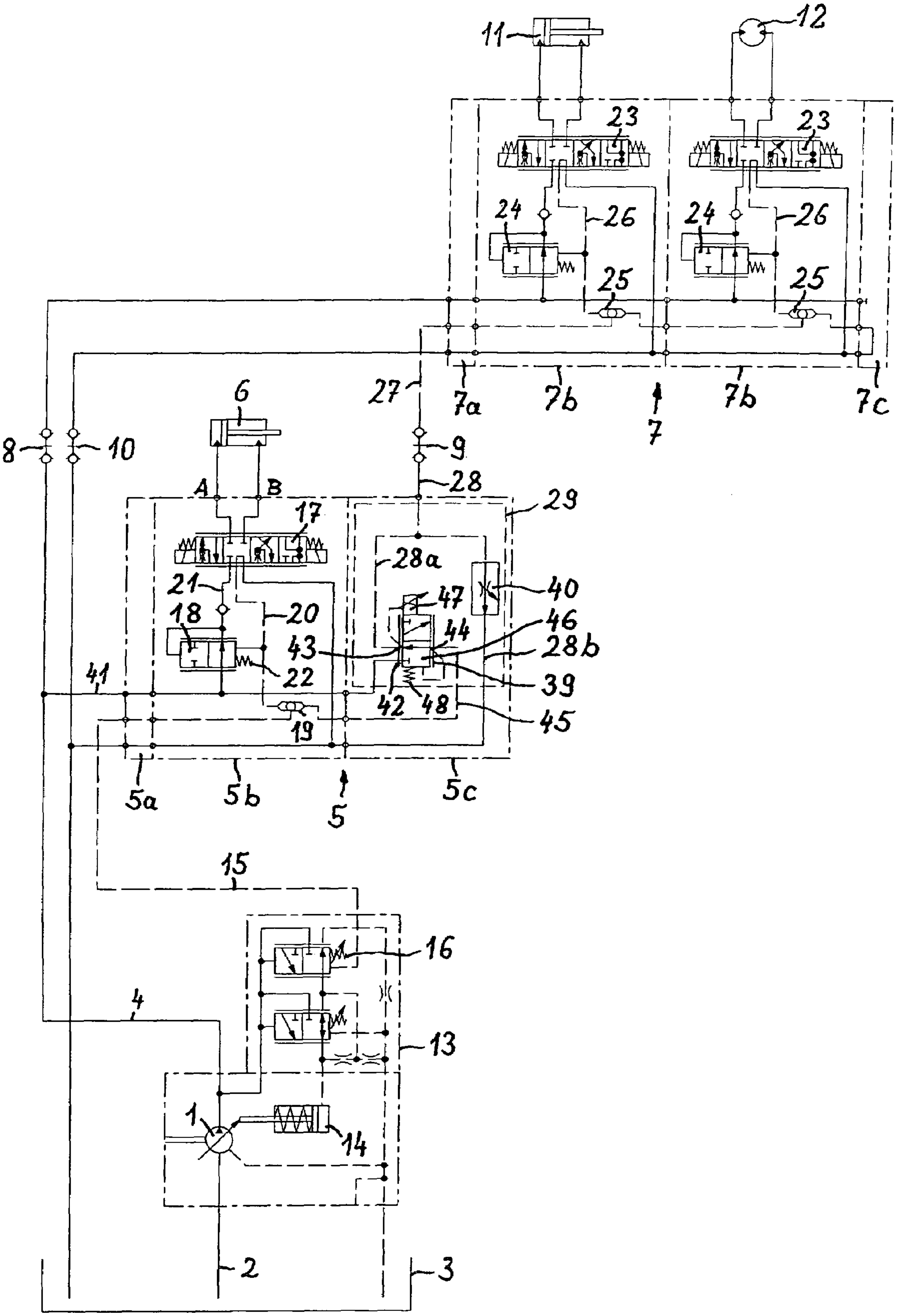
11
12
23
23
24
26
24
26
25
25
27
7a
7b
7
7b
7c
6
8
10
9
A
B
28
29
17
28a
21
20
47
40
18
46
44
43
28b
22
41
39
42
48
45
19
5a
5b
5
5c
15
16
4
13
1
14
2
3

HYDRAULIC SYSTEM FOR UTILITY VEHICLES, IN PARTICULAR AGRICULTURAL TRACTORS

This application is based on, and claims priority to, UK Application No. 0522719.4, filed Nov. 8, 2005.

BACKGROUND OF THE INVENTION

The invention relates to a hydraulic system for utility vehicles, in particular agricultural tractors, for supplying primary and/or auxiliary pressure medium consumers with pressure medium, comprising a pump sucking from a pressure medium tank, said pump being controlled as a function of the load pressure of the pressure medium consumers and supplying a pump pressure exceeding the load pressure by a predetermined control pressure differential, whereby in order to produce a first control pressure differential for operating a primary pressure medium consumer its load pressure acts upon the pressure and flow controller of the pump and in order to produce a second, higher control pressure differential for operating auxiliary pressure medium consumers a pressure exceeding their load pressure is produced by means of an amplifier device, which acts upon the pressure and flow controller.

European Patent EP 110 70 852 A2 describes such hydraulic system with a fixed displacement pump. Assigned to that pump is a device consisting of a pressure control valve with an inlet for an actuating pressure that enables the pump to deliver pressure medium to the pressure medium consumers at a necessary pressure and (flow) output. In the case of this system, for operating both the vehicle external (hereafter: primary and auxiliary) pressure medium consumers, the actuating pressure for the pressure control valve of the pump is picked up between the two orifices of the amplifier device. In order to provide different control pressures as they are needed to produce the various control pressure differentials for these pressure medium consumers, the line containing the orifices is blocked off by means of an additional pressure regulator, whenever a primary pressure medium consumer is in operation and open whenever an auxiliary pressure medium consumer is in operation. A disadvantage here is that the load pressure of the primary pressure medium consumers, which is utilized as actuating pressure for operating said pressure medium consumers is subject to restriction when passing through the one orifice. As a consequence the actuating pressure takes longer to build up and finally the system dynamics are lower as a result.

A further disadvantage of the prior art hydraulic system is apparent if no implement is mounted on the vehicle, i.e. no auxiliary pressure medium consumer is connected to the hydraulic system of the vehicle. In this case it is possible that due to thermal expansion of the pressure medium inside the load pressure line for auxiliary pressure medium consumers or due to a leakage in the pressure regulator adjacent to the orifices, pressure medium flows to the pressure control valve of the pump. The effect of this is automatic restriction of the pump even as far as actuation of the assigned pressure relief valve (pump short-circuit).

The object of the invention is seen as providing a hydraulic system of the type mentioned at the beginning, wherein the disadvantages described are eliminated and which in particular without any time delay makes available the load pressure of a primary pressure medium consumer as actuating pressure for the device assigned to the pump.

BRIEF SUMMARY OF THE INVENTION

The object is achieved by the fact that the amplifier device consists of a proportionally controllable pressure reducing valve with a control piston, a pressure inlet connected to a pressure pipe, a load pressure inlet connected to a load pressure reporting pipe conducting the load pressure of the auxiliary pressure medium consumers and a load pressure outlet, whereby the control piston is subjected on the one side to the variable force of an electromagnet and the load pressure prevailing at the load pressure inlet of the auxiliary pressure medium consumers and on the other side to the force of an adjustable spring and the pressure prevailing at the load pressure outlet.

This arrangement enables the cost of the amplifier device to be kept to a minimum, in order to make available the control pressure differential needed for operating the primary or auxiliary pressure medium consumers respectively. The necessary control pressure differential can be adjusted by corresponding actuation (excitation) of the electromagnet. In this case a differential pressure is added to the load pressure at the load pressure inlet of the pressure reducing valve and thus the load pressure at the load pressure outlet is increased accordingly. In the technically simplest way this can be effected by the vehicle driver while he is working if a suitable control element is provided at his workplace.

Since the load pressure of the primary pressure medium consumers is not conducted via an orifice of the amplifier device, but is supplied directly to the pressure and flow controller of the pump without manipulation, whenever a primary pressure medium consumer is actuated the pump responds with rapid pressure build-up and delay-free supply of the necessary pressure medium.

In this case the flow control valve according to Claim 2 reliably prevents pressure from building up in the amplifier device due for example to thermal expansion of the pressure medium, which may affect the pressure and flow controller of the pump in an undesirable way.

BRIEF DESCRIPTION OF THE DRAWINGS

The invention is described below in detail on the basis of a drawing showing a circuit diagram for a hydraulic system.

DETAILED DESCRIPTION OF THE INVENTION

In the circuit diagram for a hydraulic system of an agricultural tractor, a variable volume displacement pump referenced with 1 sucks pressure medium via a suction line 2 from a pressure medium tank 3 and supplies this via pressure pipes 4, 41 to a tractor-mounted control block 5. From here the pressure medium is distributed to primary pressure medium consumers 6, directly connected to the hydraulic system. The pressure medium is further distributed to auxiliary pressure medium consumers 11, 12 by means of an auxiliary control block 7, connected with hydraulic couplings 8, 9, 10 to the hydraulic system of the tractor. "Pressure medium consumers" here are understood as single and double acting hydraulic actuators (linear actuators and rotating actuators) for driving different implements such as, for example, the primary cylinder of the 3-point linkage for implements or the auxiliary actuating cylinder of an externally mounted front loader.

A pressure and a flow controller 13 is mounted on the pump 1, the purpose of that device consists in controlling, via an adjustment piston 14, the flow rate of the pump 1 as a function of the load pressure of the operating pressure medium consumers (communicated via a load pressure reporting line 15) in such a way that a defined pressure gradient, also called control pressure differential, always prevails between the pressure pipe 4 and the load pressure reporting line 15. The pressure gradient of approx. 20 bar required for operating primary pressure medium consumers 6 is adjusted by pretensioning a compression spring 16. In all other respects such a pressure and flow controller 13 is presumed to be familiar and therefore is not described in detail.

The primary control block 5 consists of an inlet section 5*a*, a valve section 5*b* and a sealing plate 5*c*, which are all bolted together to form a unit. Several valve sections 5*b* can be provided depending on the number of pressure medium consumers 6 to be operated.

The valve section 5*b* contains a solenoid-operated main slide valve 17 of the load pressure sensing type, a section pressure regulator 18 and a shuttle valve 19. The primary pressure medium consumer 6 is connected to the connections A and B communicating with the main slide valve 17. Its pressure medium is supplied via the pressure pipe 41. Its load pressure is supplied to the pressure and flow controller 13 via load pressure reporting line 20, shuttle valve 19 and load pressure reporting line 15. The section pressure regulator 18 lies in a pressure pipe 21 branching off from the pressure pipe 41 to the main slide valve 17 and by the corresponding pretensioning of a spring 22 permits a desired pressure gradient to be adjusted between the pressure pipe 21 and the load pressure reporting line 20.

Customary values for the pressure gradient are approx. 8 bar. Therefore a pressure differential of approx. 12 bar is available to compensate for any flow losses between the pump 1 and the valve section 5*b*. Such adjustment of the pressure gradient ensures low-loss and reliable operation of all primary pressure medium consumers 6 connected to the valve sections 5*b*.

The auxiliary control block 7 is arranged on an implement, a potato digger for example, and consists of an inlet section 7*a*, several valve sections 7*b*, whereby a valve section 7*b* is present and a sealing plate 7*c* for each pressure medium consumer 11, 12 operated with the implement. Each auxiliary valve section 7*b* includes a section pressure regulator 24 with a solenoid-operated main slide valve 23 of the load pressure sensing type, and a shuttle valve 25 similar in design and operation to that of a primary valve section 5*b*. Load pressure reporting lines 26 leading from the main slide valves 23 conduct the load pressure of the auxiliary pressure medium consumers 11, 12 to shuttle valves 25. From these the highest load pressure in each case is transmitted to the auxiliary load pressure reporting line 27, which leads to the hydraulic coupling 9. From there a primary load pressure reporting line 28 conducts the highest load pressure of the auxiliary pressure medium consumers 11, 12 to an amplifier device 29, integrated into the sealing plate 5*c*.

The amplifier device 29 consists of a proportionally controllable pressure reducing valve 39 with a control range from 0 to 26 bar and a low volume flow controller (flow control valve) 40 adjusted to a nominal value of approx. 0.5 liter per minute. In the embodiment described the pressure reducing valve 39 is installed in such a way that its pressure inlet 42 is connected to the pressure pipe 41, the inlet 43 to the load pressure reporting line 28*a* branching off from the load pressure reporting line 28 and the outlet 44 to a load pressure reporting line 45. The load pressure present at the outlet 44 is conducted via the shuttle valve 19 and the load pressure reporting line 15 to the pressure and flow controller 13.

As regards forces the control piston 46 of the pressure reducing valve 39 is in a state of equilibrium, whereby the adjustable force of an electromagnet 47 as well as the pressure at the inlet 43 acts upon the one side of the control piston 46 and the force of a spring 48 as well as the return pressure at the outlet 44 acts upon the other side of the control piston 46.

Typically such pressure reducing valves are used to reduce pressure at the pressure inlet 42 by controlled excitation of the electromagnet 47 and to make the reduced pressure, whose amount is proportional to the excitation, available to the outlet 44. Otherwise than proposed in the present embodiment with conventional circuitry of the pressure reducing valve 39 the connection actually used as inlet 43 for the load pressure of the auxiliary pressure medium consumers 11, 12 therefore represents a tank inlet, while the pressure at the outlet 44 is used to actuate further valves.

The low volume flow controller (flow control valve) 40 lies in a branch line 28*b* of the load pressure reporting line 28. Consequently it is guaranteed that if attachments are not mounted no unintentional load pressure reporting occurs through a thermally-induced pressure increase in the load pressure reporting line 28.

Load pressure of the control block 7 according to the circuit diagram lies on the inlet 43 of the pressure reducing valve 39. With the electromagnet 47 not excited this load pressure is looped to the outlet 44 in the ratio 1:1 by the pressure reducing valve. By exciting the electromagnet 47 a differential pressure is added to the load pressure at the inlet 43. The electromagnet 47 is excited from the workplace of the driver, where a control element suitable for this is provided. In this case the amount of the differential pressure can be selected by the driver from between 0 and 26 bar and also changed while he is driving. In this way a differential pressure determined by the driver depending on different attachments and operating temperatures can therefore be added to the constantly changing load pressure of the control block 7. The load pressure increased by the differential pressure is now reported to the pressure and flow controller 13 via the load pressure reporting lines 45 and 15. This ensures that the pump 1 supplies a substantially higher flow compared to the operation of a primary pressure medium consumer 6 and thus guarantees trouble-free operation of the pressure medium consumers 11, 12.

The invention has been described on the basis of a hydraulic system with a variable volume displacement pume. Should the invention be used in conduction with a fixed displacement pump then is nothing to do but to connect the pressure reporting line 15 to the corresponding inlet of the pressure and flow controller of the fixed displacement pump. Such pressure and flow controllers are well known therefore a closer description thereof is unnecessary.

The invention claimed is:

1. Hydraulic system for utility vehicles, in particular agricultural tractors, for supplying primary and/or auxiliary pressure medium consumers (6, 11, 12) with pressure medium, comprising a pump (1), sucking from a pressure medium tank (3), the pressure of said pressure medium being controlled as a function of the load pressure of the pressure medium consumers and exceeding the load pressure by a predetermined control pressure differential, whereby in order to produce a first control pressure differential for operating a primary pressure medium consumer its load pressure acts upon a pressure and flow controller (13) assigned to the pump and in order to produce a second, higher control pressure differential for operating auxiliary pressure medium consumers (11, 12) a pressure exceeding their load pressure is produced by means of an amplifier device (29), which acts upon the pressure and flow controller, characterized in that the amplifier device (29) consists of a proportionally controllable pressure reducing valve (39) with a control piston (46), a pressure inlet (42) connected to a pressure pipe (41), an inlet (43) connected to a load pressure reporting pipe (28*a*) conducting the load pressure of the auxiliary pressure medium consumers (11, 12) and an outlet leading to the pressure and flow controller (13), whereby the control piston (46) is subjected on the one side to the variable force of an electromagnet (47) and the load pressure prevailing at the inlet (43) of the auxiliary pressure medium consumers (11, 12) and on the other side to the force of an adjustable spring (48) and the pressure prevailing at the outlet (44).

2. Hydraulic system according to claim 1, characterized in that the load pressure reporting line (28) conducting the load pressure of the auxiliary pressure medium consumers (11, 12) is connected via a flow control valve (40) to the pressure medium tank (3).

* * * * *